(12) United States Patent
Feng et al.

(10) Patent No.: US 9,473,960 B2
(45) Date of Patent: Oct. 18, 2016

(54) METHOD AND DEVICE FOR PROCESSING TRANSPORT CONFIGURATION DATA

(75) Inventors: Jiaojiao Feng, Shenzhen (CN); Lilin Jiang, Shenzhen (CN); Peng Zhang, Shenzhen (CN); Qiong Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 247 days.

(21) Appl. No.: 14/130,072

(22) PCT Filed: May 11, 2012

(86) PCT No.: PCT/CN2012/075372
§ 371 (c)(1),
(2), (4) Date: Dec. 30, 2013

(87) PCT Pub. No.: WO2013/000343
PCT Pub. Date: Jan. 3, 2013

(65) Prior Publication Data
US 2014/0126384 A1    May 8, 2014

(30) Foreign Application Priority Data
Jun. 30, 2011 (CN) .......................... 2011 1 0182345

(51) Int. Cl.
*H04W 24/04* (2009.01)
*H04L 12/24* (2006.01)

(52) U.S. Cl.
CPC .......... *H04W 24/04* (2013.01); *H04L 41/0233* (2013.01); *H04L 41/22* (2013.01)

(58) Field of Classification Search
CPC .. H04W 24/04; H04L 41/22; H04L 41/0233; H04L 41/085–41/0889

USPC .......... 370/242, 254; 455/418; 709/223, 224
See application file for complete search history.

(56) References Cited

U.S. PATENT DOCUMENTS 5,499,343 A * 3/1996 Pettus ..................... G06F 9/547
709/203
5,956,719 A * 9/1999 Kudo .................. H04L 41/0233
707/610

(Continued)

FOREIGN PATENT DOCUMENTS

| CN | 1640055 A | 7/2005 |
|---|---|---|
| CN | 101272279 A | 9/2008 |

(Continued)

OTHER PUBLICATIONS

Supplementary European Search Report (SESR) dated Dec. 9, 2014 for Application No. EP 12805178.6.

*Primary Examiner* — Mark Rinehart
*Assistant Examiner* — Kenneth P Hunt
(74) *Attorney, Agent, or Firm* — Ladas & Parry LLP

(57) ABSTRACT

Provided are a method and device for processing transport configuration data. In the method, each object of transport configuration data is abstracted from an LMT network management configuration system; each object is layered and encapsulated according to a hierarchical structure of an Iub interface protocol stack; and association relationship among layered objects is acquired according to a predetermined transport bearer manner. The technical solution provided in the disclosure can intuitively display the transport configuration data of the network management LMT based on the hierarchical structure of the Iub interface protocol stack, and save operational and maintenance costs.

15 Claims, 14 Drawing Sheets

(56) References Cited

U.S. PATENT DOCUMENTS

| | | | | |
|---|---|---|---|---|
| 2001/0053145 | A1* | 12/2001 | Willars | H04L 12/4604 370/352 |
| 2002/0006779 | A1* | 1/2002 | Park | H04L 41/0206 455/403 |
| 2005/0021742 | A1* | 1/2005 | Yemini | G06Q 10/04 709/224 |
| 2006/0041741 | A1* | 2/2006 | Pohjolainen | G06F 21/602 713/150 |
| 2008/0294418 | A1* | 11/2008 | Cleary | H04L 41/0803 703/21 |
| 2009/0225702 | A1* | 9/2009 | Lai | H04W 92/12 370/328 |
| 2010/0202343 | A1 | 8/2010 | Hunzinger et al. | |

FOREIGN PATENT DOCUMENTS

| | | |
|---|---|---|
| EP | 1 463 259 A1 | 9/2004 |
| JP | 2002-300279 A | 10/2002 |

* cited by examiner

| | A | B | C | D | E | F | G | H | I | J |
|---|---|---|---|---|---|---|---|---|---|---|
| 1 | Return list | | | | | | | | | |
| 2 | Management unit user label | Management unit ID | PPP link ID | PPP link No | Reference HDLC HDLCNo#1 | Reference HDLC HDLCNo#2 | Reference HDLC HDLCNo#3 | Reference HDLC HDLCNo#4 | Reference HDLC No#5 | Reference HDLC HDLCNo#6 |
| 3 | Site name | Network element number | RDN | PPP number | HDLCNo.1 | HDLCNo.2 | HDLCNo.3 | HDLCNo.4 | HDLCNo.5 | HDLCNo.6 |
| 4 | STRING[0,128] | LONG:[0,65535] | LONG | LONG:[0,7] | LONG:[0,15] | LONG:[0,15] | LONG:[0,15] | LONG:[0,15] | LONG:[0,15] | LONG:[0,15] |
| 5 | | | | DEFAULT:0 | | | | | | |
| 6 | Taken as an index if the network element number is not filled | Unique in one subunit, belong to other pages | Generated automatically, filling is not required | ML_PPP range: 0,2 | | | | | | |
| | R | R | R | R | R-W | R-W | R-W | R-W | R-W | R-W |

Fig. 9

METHOD AND DEVICE FOR PROCESSING TRANSPORT CONFIGURATION DATA

RELATED APPLICATION INFORMATION

This application is a 371 of International Application PCT/CN2012/075372 filed 11 May 2012 entitled "Method And Device For Processing Transmission Configuration Data", which was published on 3 Jan. 2013, with International Publication Number WO 2013/000343A1, which claims priority from CN 201110182345.X filed 30 Jun. 2011, the content of which is incorporated herein by reference.

TECHNICAL FIELD

The disclosure relates to the field of communications, and in particular, to a method and device for processing transport configuration data.

BACKGROUND

With the gradual maturing of radio communication network management technologies, device operators have more requirements on the technology of network management software, i.e., a necessary tool for upgrading and managing base stations, which are not only embodied in the requirements on processing speed of data and signalling, and in terms of the completeness of commands for operating the base station, the users pay more and more attention to whether the network management can abstract the managed data intuitively, whether the manpower maintenance costs can be reduced significantly, and whether the user satisfaction to which more attention is paid can be met.

The trend of the base station network management technology is to realize the decoupling of base station-side data and network management-side data, which has evolved from a data management manner with higher coupling based on a table form to a data topology representation manner based on an object form.

The transport data model is an important constitution part of a local maintenance terminal (LMT) of base station network management, and mainly demonstrates the configuration manner and dependence of transport data. When there is an alarm at the transport data layer, it is required to represent the alarm information thereof in time and provide the state information of each transport data object in real time.

Before abstracting the transport data as provided in the present application, regarding the management of transport data, the main base station network management software in industry and the local base station network management software LMT are based on a data management manner of a table form. Specifically, each kind of transport data is abstracted into a table, the specific transport data exists in the form of table record, and in the LMT, all the transport tables employ a tree structure, as shown in FIG. 1, which cannot embody various hierarchical structures of the transport layer data. Although the data represents certain cells of the 3rd Generation Partnership Project protocol (3GPP), the hierarchical structure of the protocol cannot be abstracted since the dependence among the data is very complex (reference can be made to FIG. 2), which is not of a one-to-one structure and thus the hierarchical dependence among the data cannot be found by the operation and maintenance person. Once the underlying transport link has failed, the operation and maintenance costs are very high since the representation of the transport data is not intuitive. Besides, since the minimum unit of such data is of a representation of table record, the display of the corresponding alarm and state cannot be obtained until the record is clicked, which results in poor user experience.

SUMMARY

The disclosure provides a method and device for processing transport configuration data, so as to at least solve the problem in the related art that the representation of the transport configuration data is not intuitive and the operation and maintenance costs are very high.

According to one aspect of the disclosure, a method for processing transport configuration data is provided.

The method for processing transport configuration data according to the disclosure includes: abstracting each object of transport configuration data from a local maintenance terminal (LMT) network management configuration system; layering and encapsulating the each object according to a hierarchical structure of an Iub interface protocol stack; and acquiring association relationship among layered objects according to a predetermined transport bearer manner.

Abstracting the each object of the transport configuration data from the LMT network management configuration system includes: establishing a communication link between the LMT network management configuration system and a base station; the LMT network management configuration system acquiring the transport configuration data from the base station; and acquiring an instance of the each object of the transport configuration data.

Layering and encapsulating the each object according to the hierarchical structure of the Iub interface protocol stack includes: establishing correlation between an object and signalling of the Iub interface protocol stack; and filling the object into a predetermined number of transport protocol blocks in the Iub interface protocol stack of the signalling corresponding to the object.

Acquiring the association relationship among the layered objects according to the predetermined transport bearer manner includes: acquiring objects layered according to the hierarchical structure of the Iub interface protocol stack; and acquiring the association relationship among the layered objects according to an Internet Protocol (IP) transport bearer manner.

Acquiring the association relationship among the layered objects according to the predetermined transport bearer manner includes: acquiring objects layered according to the hierarchical structure of the Iub interface protocol stack; and acquiring the association relationship among the layered objects according to an asynchronous transfer mode (ATM) transport bearer manner.

After acquiring the association relationship among the layered objects according to the predetermined transport bearer manner, the method further includes: acquiring alarm information of the each object; and adding identification information to a highest alarm level corresponding to the each object.

After acquiring the association relationship among the layered objects according to the predetermined transport bearer manner, the method further includes: acquiring state information of the each object in a transport protocol block; judging whether there is a faulty object; and adding fault indication information to the faulty object.

According to another aspect of the disclosure, a device for processing transport configuration data is provided.

The device for processing transport configuration data according to the disclosure includes: an abstraction module, configured to abstract each object of transport configuration data from a local maintenance terminal (LMT) network management configuration system; a layering and encapsulation module, configured to layer and encapsulate the each object according to a hierarchical structure of an Iub interface protocol stack; and a first acquisition module, configured to acquire association relationship among layered objects according to a predetermined transport bearer manner.

The abstraction module includes: a first establishment unit, configured to establish a communication link between the LMT network management configuration system and a base station; a first acquisition unit, configured to enable the LMT network management configuration system to acquire the transport configuration data from the base station; and a second acquisition unit, configured to acquire an instance of the each object of the transport configuration data.

The layering and encapsulation module includes: a second establishment unit, configured to establish correlation between the object and signalling of the Iub interface protocol stack; and a filling unit, configured to fill the object into a predetermined number of transport protocol blocks in the Iub interface protocol stack of the signalling corresponding to the object.

The first acquisition module includes: a third acquisition unit, configured to acquire objects layered according to the hierarchical structure of the Iub interface protocol stack; and a fourth acquisition unit, configured to acquire the association relationship among the layered objects according to an Internet Protocol (IP) or asynchronous transfer mode (ATM) transport bearer manner.

The device further includes: a second acquisition module, configured to acquire alarm information of the each object; and a first processing module. configured to add identification information to a highest alarm level corresponding to the each object.

The device further includes: a third acquisition module, configured to acquire state information of the each object in a transport protocol block; a judgment module, configured to judge whether there is a faulty object; and a second processing module, configured to add fault indication information to the faulty object.

By means of the disclosure, LMT transport configuration data are modelled based on the Iub interface protocol stack, which solves the problem in the related art that the representation of the transport configuration data is not intuitive and the operation and maintenance costs are very high. By virtue of the disclosure, the transport configuration data of the network management LTM can be represented intuitively based on the hierarchical structure of the Iub interface protocol stack and the operation and maintenance costs can be saved.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings:

FIG. 9 is a schematic diagram of an Excel template file saving MO object attribute information according to a preferred embodiment of the disclosure;

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
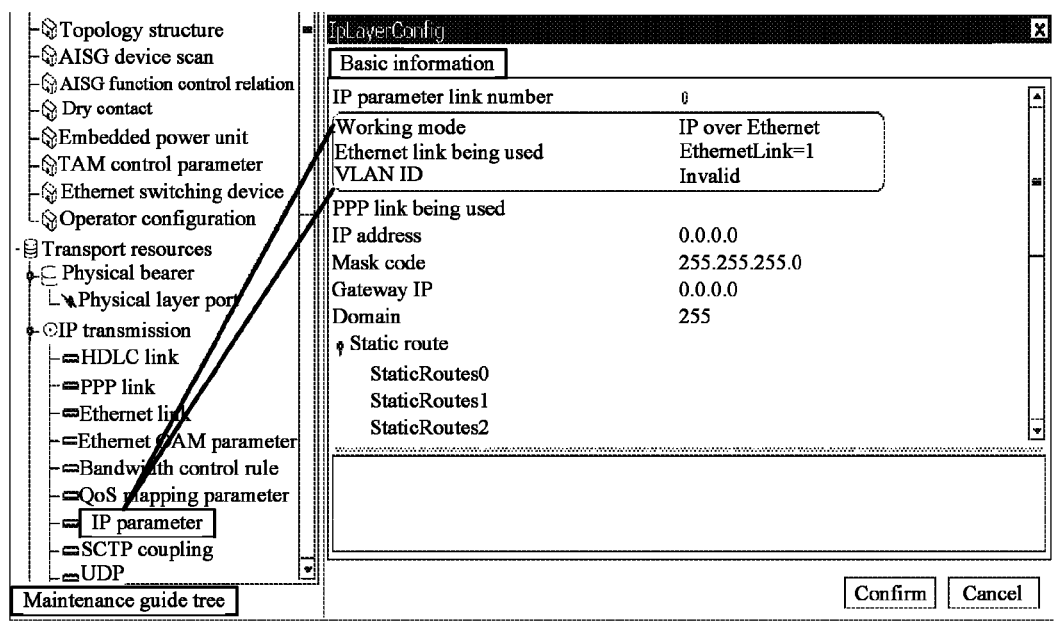
FIG. 1 is a snapshot of table tree representation of the transport data.
Figure 2:
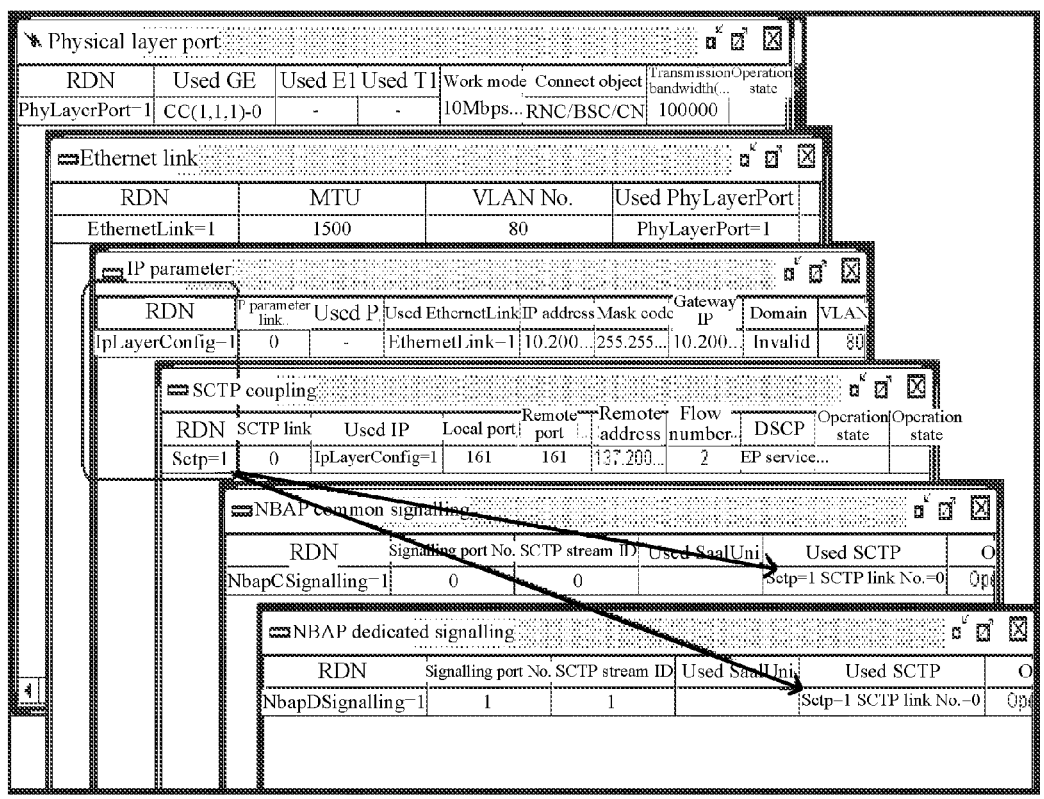
FIG. 2 is a snapshot of the association relationship of a table representation of transport data.
Figure 3:
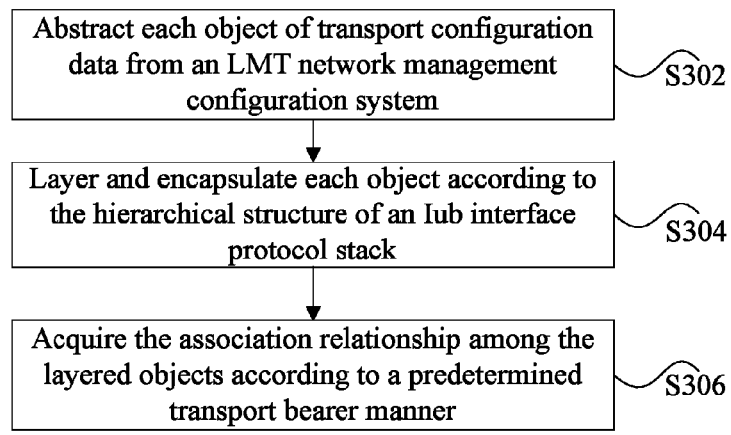
FIG. 3 is a processing flowchart of a method for processing transport configuration data according to an embodiment of the disclosure.

FIG. 3 is a processing flowchart of a method for processing transport configuration data according to an embodiment of the disclosure. As shown in FIG. 3, the method for processing transport configuration data mainly includes steps as follows.

Step S302: each object of transport configuration data is abstracted from an LMT network management configuration system;

Step S304: each object is layered and encapsulated according to a hierarchical structure of an Iub interface protocol stack; and Step S306: association relationship among layered objects is acquired according to a predetermined transport bearer manner.

In the related art, the management of transport configuration data by the network management software is mainly a data management manner based on a table form, for which management manner, the hierarchical structure of the protocol cannot be abstracted. Besides, since the dependence among the data is very complex, which is not of a one-to-one structure, the hierarchical dependence among the data cannot be found by the operation and maintenance person. Once the underlying transport link has failed, the operation and maintenance costs are very high since the representation of the transport data is not intuitive. Using the method for processing transport configuration data shown in FIG. 3 to model the LMT transport configuration data based on the Iub interface protocol stack can clearly represent the hierarchical structure and the dependence of the transport data, and thus can intuitively display the transport configuration data of the network management LMT and save the operation and maintenance costs.

Preferably, Step S302 may further include the following processing:

(1) a communication link is established between the LMT network management configuration system and a base station;

(2) the LMT network management configuration system acquires the transport configuration data from the base station; and (3) an instance of each object of the transport layer configuration data is acquired.

It is known that NodeB and RNC are two independent network elements, and the interface which connects both is the Iub interface. Radio access network elements are usually divided into two parts in function, i.e., radio network (layer) and transport network (layer), and the so-called transport configuration data are those for transferring the signalling and user information of the radio network layer and the transport network layer in the Iub interface.

Figure 4:
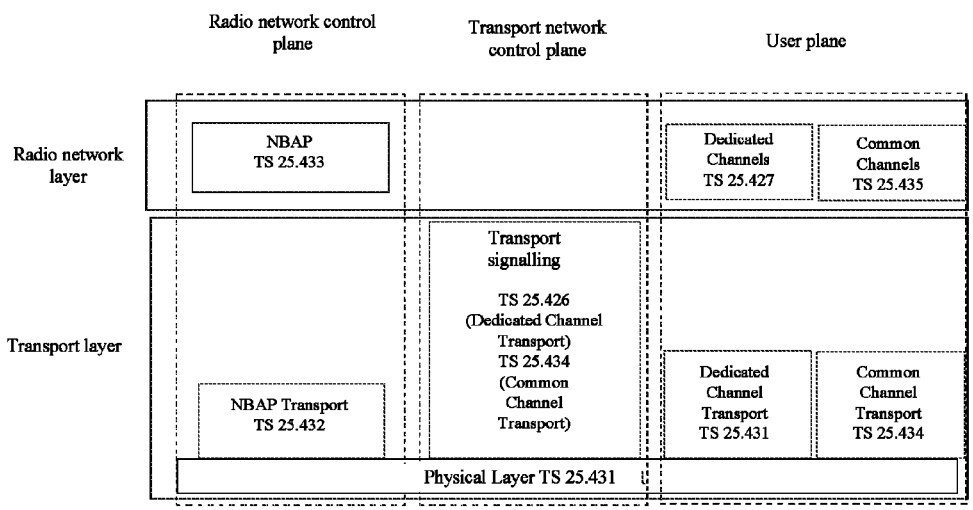
FIG. 4 is a schematic diagram of an tub interface protocol stack of 3GPP.

3GPP divides the information transferred over the Iub interface of NodeB into 3 "logic planes" in the vertical direction: radio network control plane, transport network control plane and user plane, and reference can be made to FIG. 4.

It can be seen from the Iub interface protocol stack of 3GPP that the radio network control plane is divided into two parts:

a first part, which belongs to the radio network layer and is a "NodeB application part", wherein the protocol the part follows is "NBAP protocol";

a second part, which belongs to the transport layer, and since NodeB and RNC each need a transport network to bear the information to be exchanged independently, the functions of the transport layer are to bear NBAP protocol information and ensure that the RNC and NodeB complete NBAP communication smoothly.

That is to say, the transport data layer of LMT is to provide a bearer for NBAP signalling, and the configuration of the object of this part of transport configuration data is agreed by the NodeB and RNC in advance, each of them configures corresponding parameters through the respective network management software.

Figure 5:
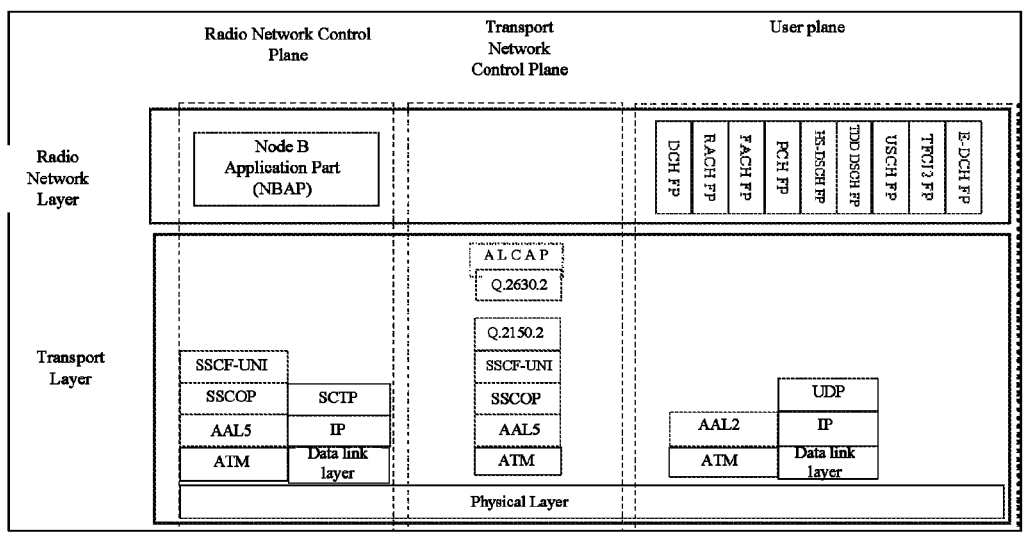
FIG. 5 is a logic schematic diagram of an Iub interface of 3GPP.

The protocol stack is further abstracted as the hierarchical structure of the Iub interface logic plane of 3GPP according to the cell therein, that is, the original model of the modelling model of the transport data layer of the LMT is as shown in FIG. 5, and the LMT further abstracts the topology representation of the transport data thereof based on this protocol stack model.

During a preferred implementation, in order to model the transport configuration data of the LMT based on the Iub interface protocol stack, it is required to first abstract the transport data managed by the network management as various objects (referred to as MO object hereinafter), establish an MO object model of the transport data of the LMT, the transport resource MO taking Transport Network as the root node, perform modelling according to the Iub and Abis interface transport protocol stacks between the base station and the superior network element RNC/BSC (in LTE, the base station docks with CN), and successively abstract Ethernet interface, E1/T1 interface, Internet Protocol (IP), Asynchronous Transfer Mode (ATM), NBAP. BTSM and so on from the physical layer to the application layer, and the design of the transport data after objectification is as shown in FIG. 6.

Figure 6:
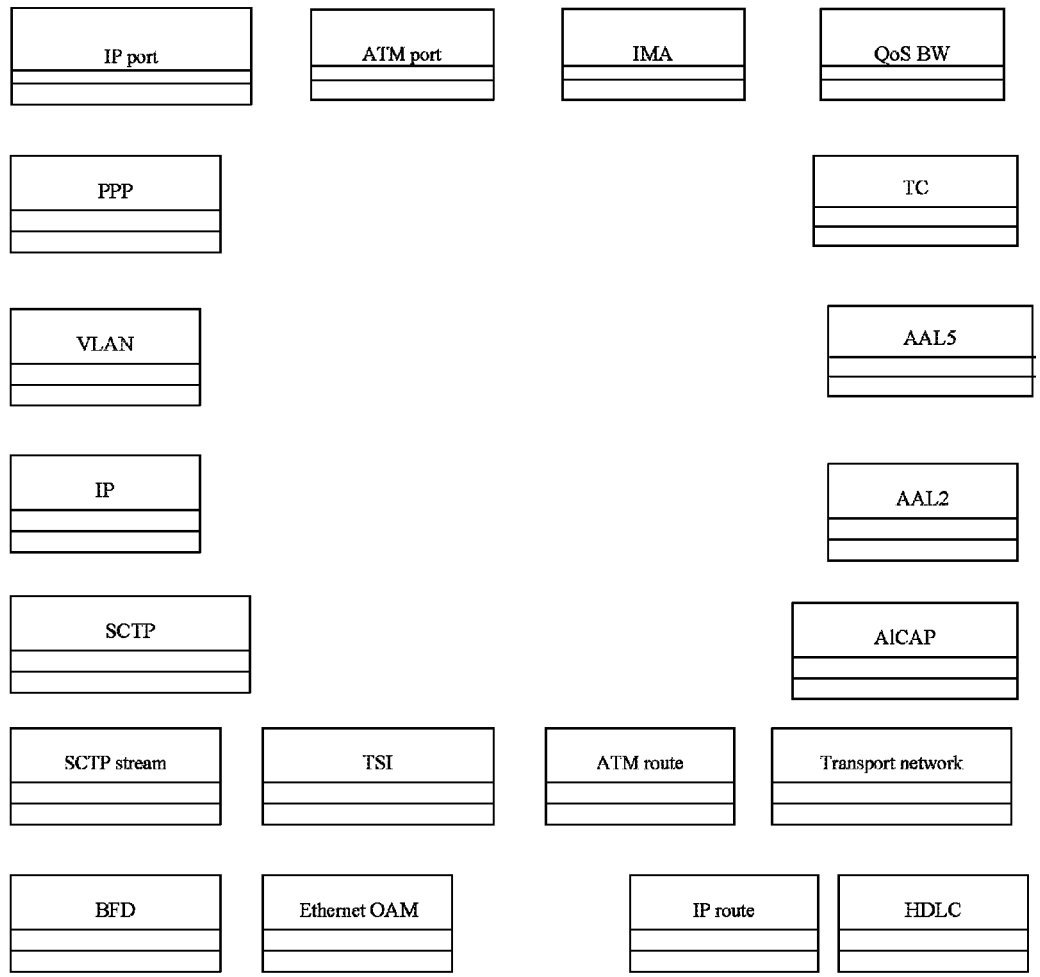
FIG. 6 is an abstract class diagram after objectification of transport data according to a preferred embodiment of the disclosure.
Figure 7:
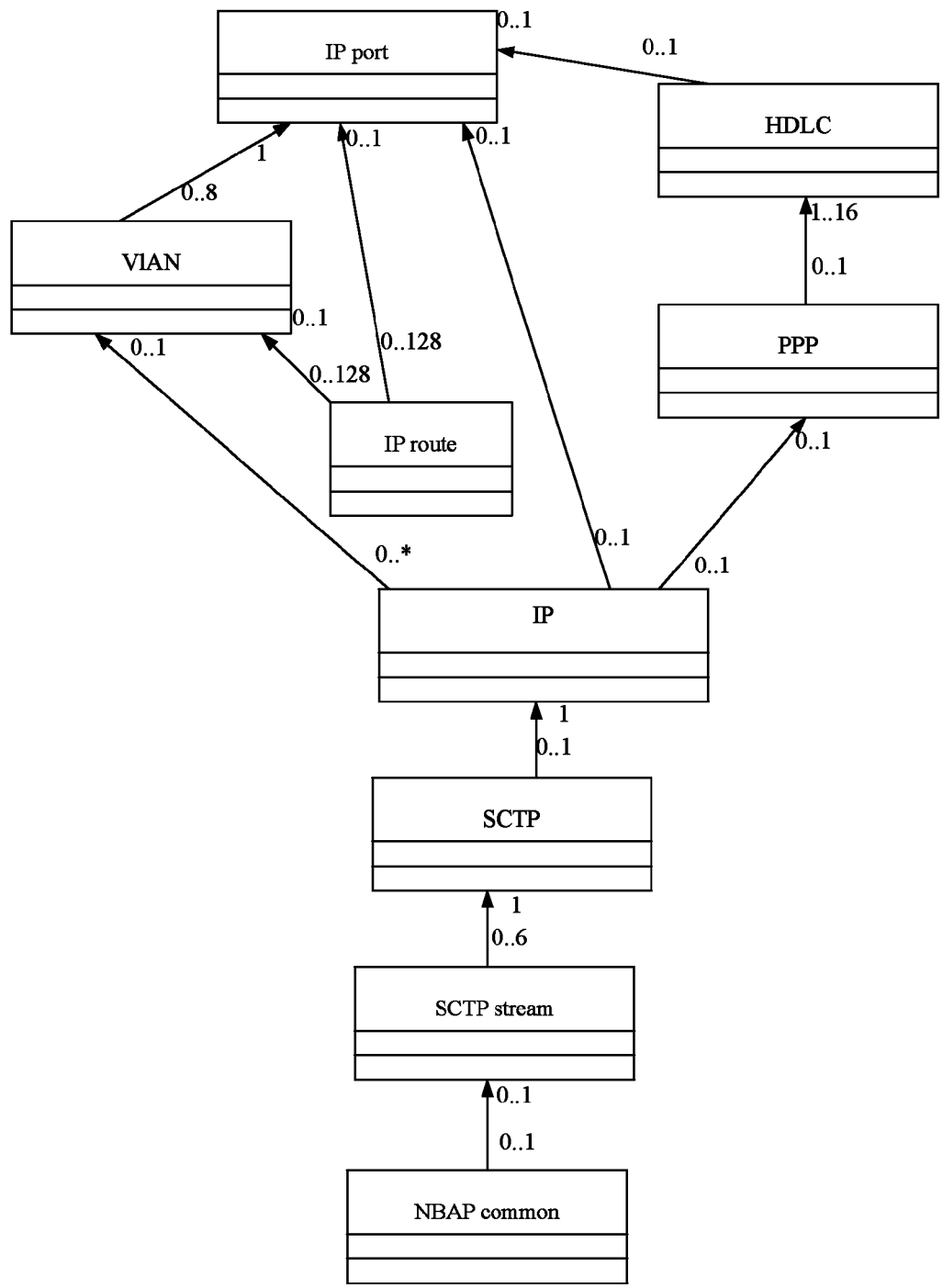
FIG. 7 is an association diagram of an IP bearer manner according to a preferred embodiment of the disclosure.
Figure 8:
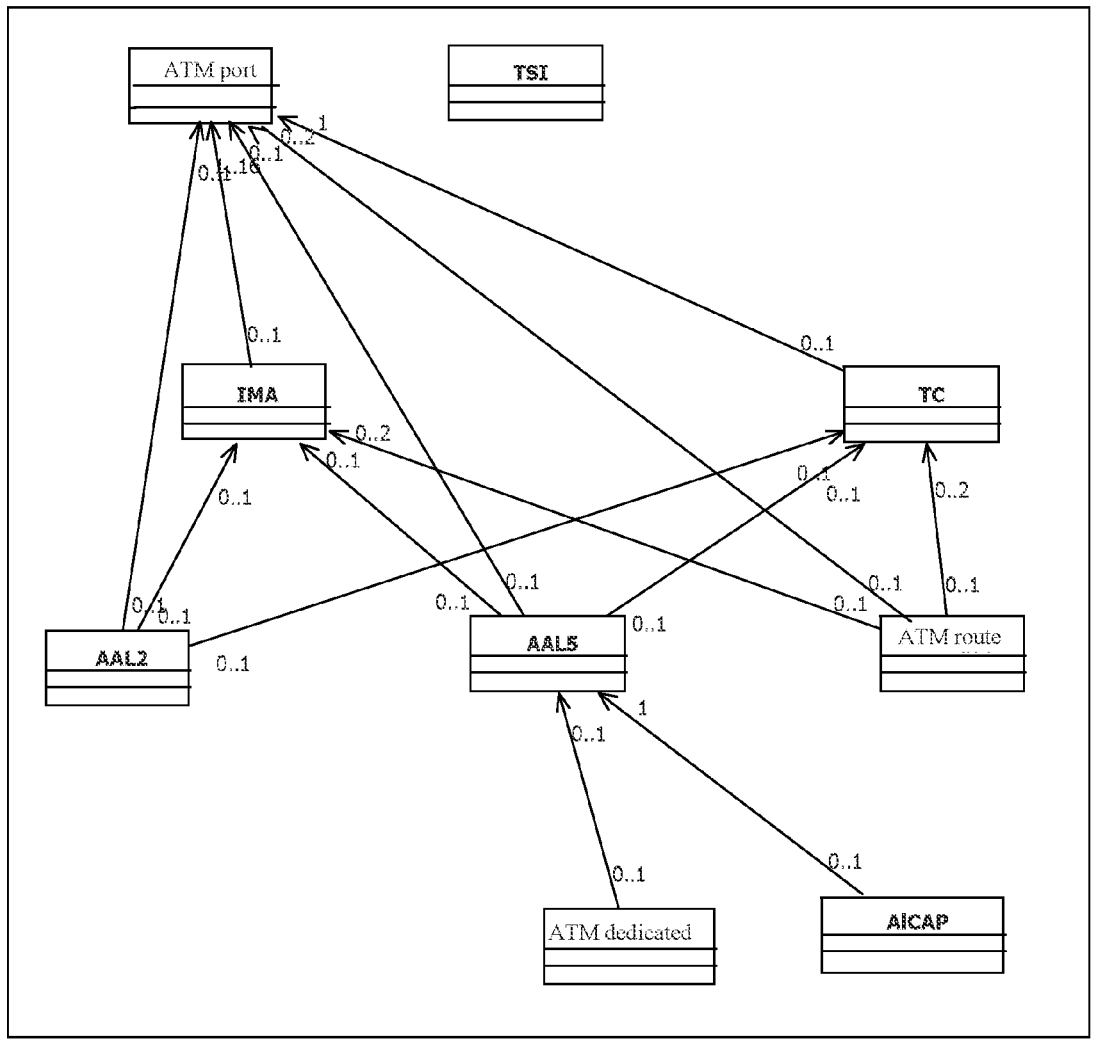
FIG. 8 is an association diagram of an asynchronous transfer mode (ATM) bearer manner according to a preferred embodiment of the disclosure.

During a preferred implementation, after the objectification design of the LMT transport object, 20 transport class objects as shown in FIG. 6 can be extracted according to the decoupling design of the original LMT transport table data. The design of each class defines the basic attribute of this class (for example, basic information such as transport link number, port number and so on). Due to the protocol hierarchical relationship among various transport classes, there is a certain association relationship among various transport classes, for example, the existence of the MO of the high-layer link has to depend on the MO of the underlying link. Therefore, with reference to the actual scenario during real transport configuration, two transport bearer manners are extracted, i.e., IP transport bearer manner, as shown in FIG. 7, and ATM transport bearer manner, as shown in FIG. 8, and in the following, a whole set of mutually dependent MO transport data objects which are needed and can be sent to the foreground base station can be generated using the designed MO attribute model and dependence.

Figure 10:
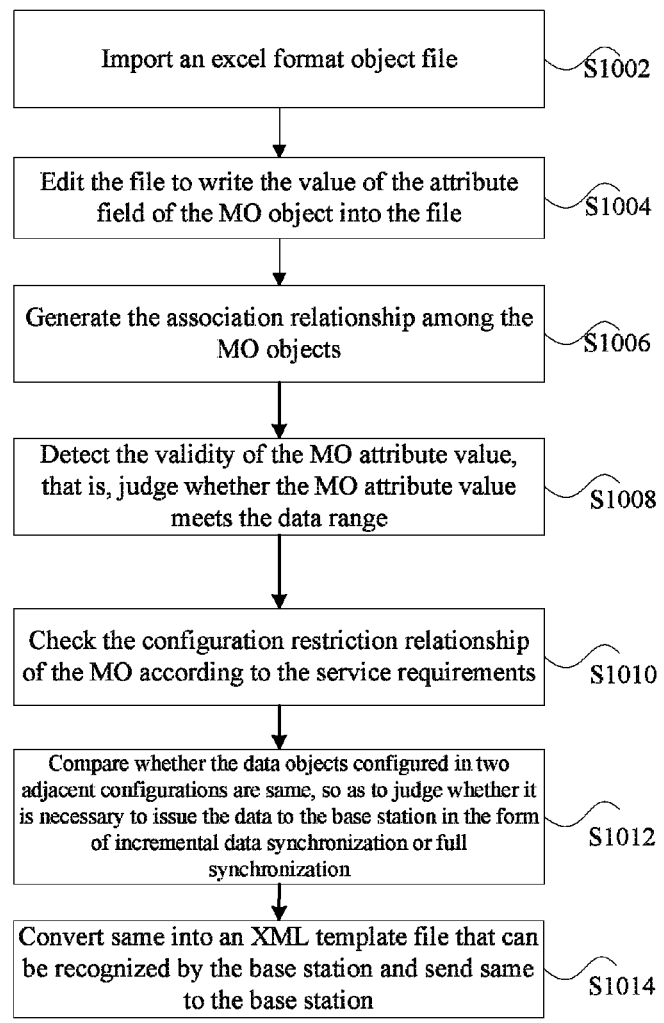
FIG. 10 is a flowchart of importing an MO object template file in an Excel format and sending same to a base station according to a preferred embodiment of the disclosure.

Then, 20 pieces of designed MO data can be saved in the form of Excel format files, each page stores one transport data object, as shown in FIG. 9, the basic attribute of this MO object is defined in each page, such as the value range of the basic attribute, the type of the value and so on; in addition, each page also includes the attribute value of the MO object on which this MO object depends, so that the associated MO object can be found on this basis, and then the procedure of importing the Excel format MO object template files and sending same to the base station is performed, which procedure will be described further in combination with FIG. 10.

As shown in FIG. 10, this procedure may include the following processing:

Step S1002: an excel format object file is imported;

Step S1004: the file is edited to write the value of the attribute field of the MO object into the file;

Step S1006: the association relationship among the MO objects is generated;

Step S1008: the validity of the MO attribute value is detected, that is, it is judged whether the MO attribute value meets the data range;

Step S1010: the configuration restriction relationship of the MO is checked according to the service requirements;

Step S1012: it is compared whether the data objects configured in two adjacent configurations are same, so as to judge whether it is necessary to issue the data to the base station in the form of incremental data synchronization or full synchronization; and Step S1014: the data are converted into an XML template file that can be recognized by the base station and send same to the base station.

According to this data sending manner, the operation and maintenance person and the user can complete the configuration of sending the transport data to the base station by merely modifying the excel configuration file to fill the attribute value of the transport object and the attribute value of the transport object associated therewith without caring about the specific details of the dependence of the data.

In this way, the data configuration sent to the base station can be modified by way of modifying the LMT transport data of the excel file and importing the file, and thus the modification of the data is very flexible. However, being flexible to change the data is insufficient to the operation and maintenance, transport data involves many Iub protocol details, and these details may not need the operation and maintenance to care, which thus needs an intuitive and layered representation, so that the operation and maintenance person can view the hierarchical dependence of the LMT transport data without caring about the specific details of the protocol, which can improve the maintenance efficiency of the operation and maintenance person fundamentally, and therefore, the representation diagram of the LMT transport data needs to be abstracted from the logic diagram of the Iub protocol stack.

Preferably, Step S304 may further include the following processing:

(1) correlation between an object and signalling of the Iub interface protocol stack is established: and (2) the object is filled into a predetermined number of transport protocol blocks in the Iub interface protocol stack of the signalling corresponding to the object.

During a preferred implementation, 20 designed MO transport objects are classified according to the Iub interface protocol of 3GPP, and in this procedure, the transport topology diagram can be divided into a predetermined number of protocol blocks (such as 11) as follows:

(1) Physical Layer: it is equivalent to the physical layer of the Iub protocol logic diagram and a physical layer object can be filled in this protocol block. including an IP port and an ATM port;

(2) ATM Link: it is equivalent to the ATM layer in the ATM bearer of the Iub protocol logic diagram, and an AtmLayerLink object can be filled in this protocol block;

(3) Ethernet/PPP Link: it is equivalent to the Data Link layer of the Iub protocol logic diagram, and a data link object can be filled in this protocol block, including Ethernet, HDLC and PPP;

(4) IP: it is equivalent to the IP layer of the Iub protocol logic diagram, and an IP object can be filled in this protocol block;

(5) SCTP: it is equivalent to the SCTP layer of the Iub protocol logic diagram, and an SCTP object can be filled in this protocol block;

(6) UDP/RTP: it is equivalent to the UDP layer of the Iub protocol logic diagram, and a UDP/RTP object can be filled in this protocol block;

(7) AAL2: it is equivalent to the AAL2 layer of the Iub protocol logic diagram, and an AAL2 object can be filled in this protocol block;

(8) SaalUni: it is equivalent to the AAL5/SSCOP/SSCF-UM layer of the Iub protocol logic diagram, and a SaalUni object can be filled in this protocol block;

(9) ALCAP: it is equivalent to the ALCAP layer of the Iub protocol logic diagram, and an ALCAP object can be filled in this protocol block;

(10) NbapCSignalling/NbapDSignalling/BTSM: it is equivalent to the NBAP layer of the tub protocol logic diagram, and a NBAP object can be filled in this protocol block;

(11) Iub/Aibs DataStream: it is equivalent to the Channels layer of the Iub protocol logic diagram, and an Iub/AibsDataStream object can be filled in this protocol block.

Figure 11:
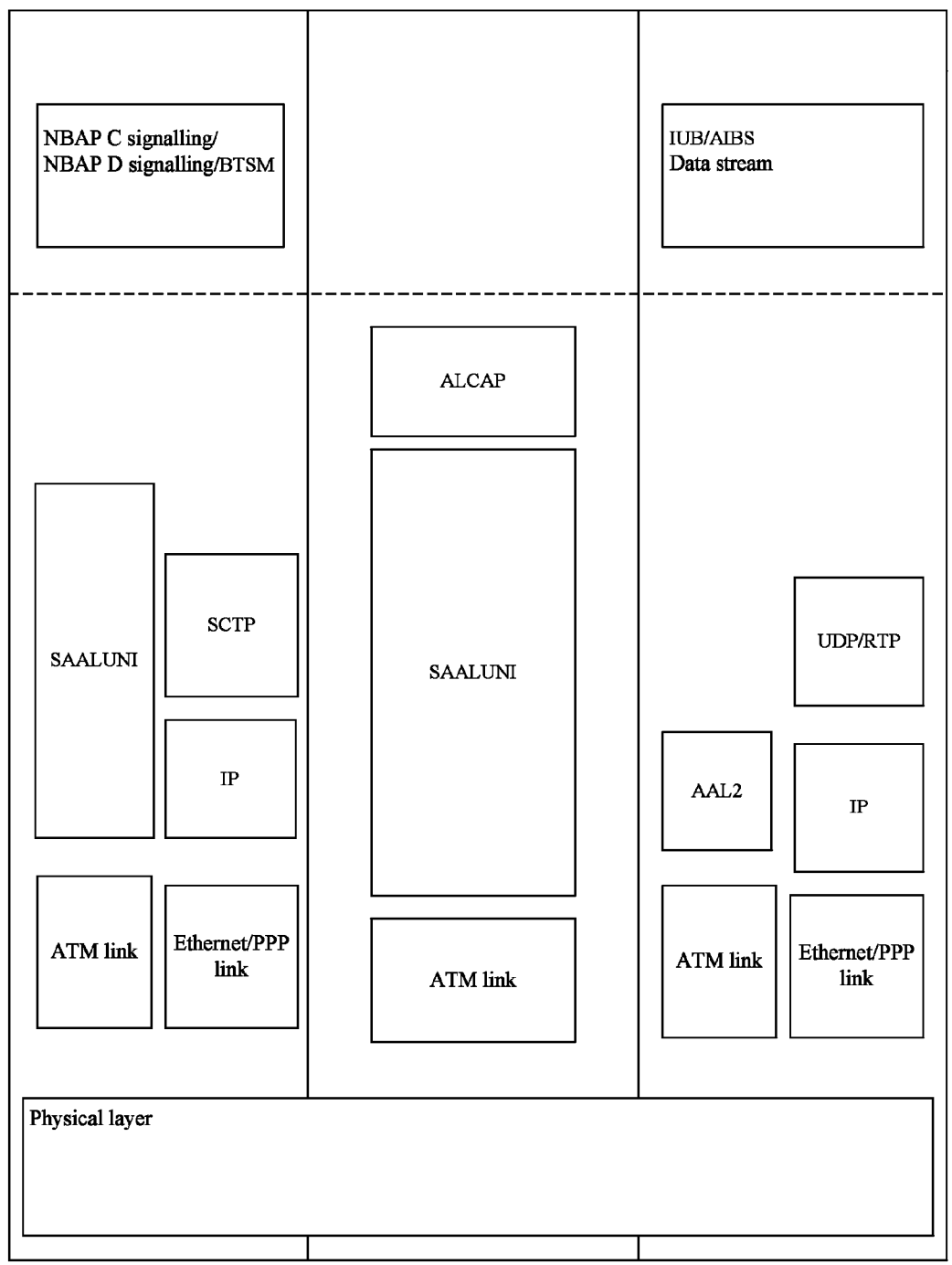
FIG. 11 is a displayed topology diagram of LMT objectification-represented transport MO object according to a preferred embodiment of the disclosure.

In this way, 20 MO objects of the LMT transport data have been modelled by taking the Iub protocol logic diagram as the original model and filled into 11 protocol blocks of the LMT topology representation protocol stack diagram, and the hierarchical design of the transport data is completed. The generated modelling effect of LMT transport data topology representation is as shown in FIG. 11.

Preferably, Step S306 may further include the following processing:

(1): an object layered according to the hierarchical structure of the Iub interface protocol stack is acquired; and (2) the association relationship among the layered objects is acquired according to an IP transport bearer manner.

Preferably, Step S306 may further include the following processing:

(1): an object layered according to the hierarchical structure of the Iub interface protocol stack is acquired; and (2) the association relationship among the layered objects is acquired according to an ATM transport bearer manner.

It should be noted that the predetermined transport bearer manner includes but not limited to the IP transport bearer manner and the ATM transport bearer manner, and of course, it can be other transport bearer manners.

During a preferring implementation, after the objectification of the LMT transport data is completed, based on a predetermined transport bearer manner (such as IP transport bearer manner and ATM transport bearer manner), a plurality of association relationships after MO objects are layered can be abstracted finally, and specifically, the association relationship of the IP bearer manner is as shown in FIG. 7, and the association relationship of the ATM bearer manner is as shown in FIG. 8.

By means of the above-mentioned processing, compared to the existing representation means of the network management LMT transport data, the Iub interface protocol stack structure of 3GPP is introduced to perform modelling on this basis, and the protocol stack hierarchical model of the transport data is extracted and then abstracted, and this topology representation of transport data makes the representation hierarchy of the transport layer clear and very intuitive. On one hand, such a brief representation reduces the maintenance difficulty of the operation and maintenance person, and on the other hand, this transport data dependence manner based on protocol stack also improves the user experience greatly.

Preferably, after performing Step S306, the following processing may be further included:

(1) alarm information of each object is acquired; and (2) identification information is added to the highest alarm level corresponding to each object.

Figure 12:
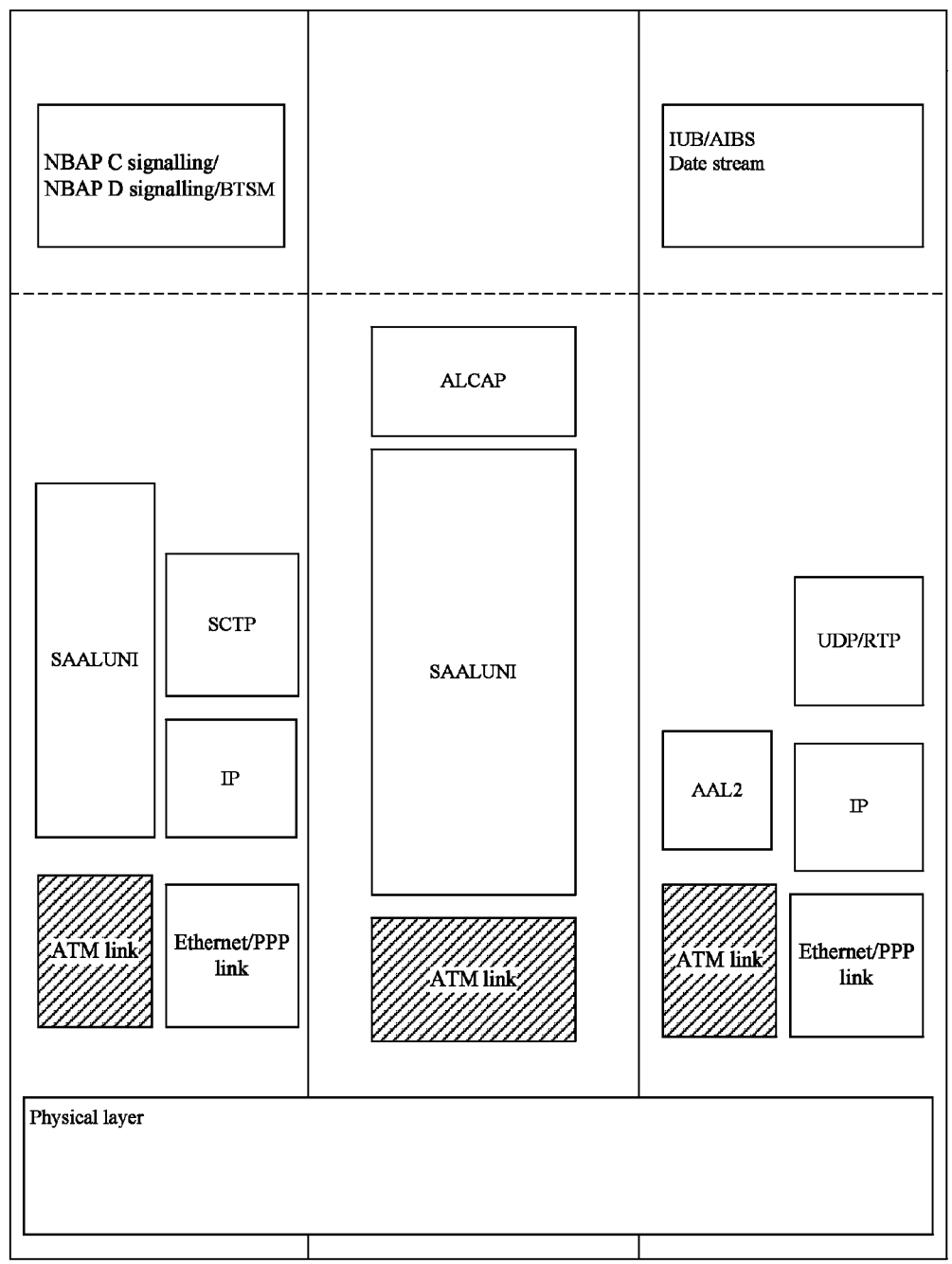
FIG. 12 is a displayed topology diagram of transport MO object alarm according to a preferred embodiment of the disclosure.

During a preferred implementation, the function of displaying the alarm on the transport MO object displaying topology diagram can be provided, and specifically, the alarm information of each MO object is acquired, identification information is added according to the highest alarm level (such as filling a colour), the highest level alarm is acquired according to the alarm view in each protocol block, and colour rendering is performed according to the alarm level. As shown in FIG. 12, the highest alarm level of ATMLink is severe alarm, and it is rendered as red (referring to the shadow portion in the figure).

Preferably, after performing Step S306, the following processing may be further included:

(1) state information of each object in the transport protocol block is acquired:

(2) it is judged whether there is a faulty object; and (3) fault indication information is added to the faulty object.

Figure 13:
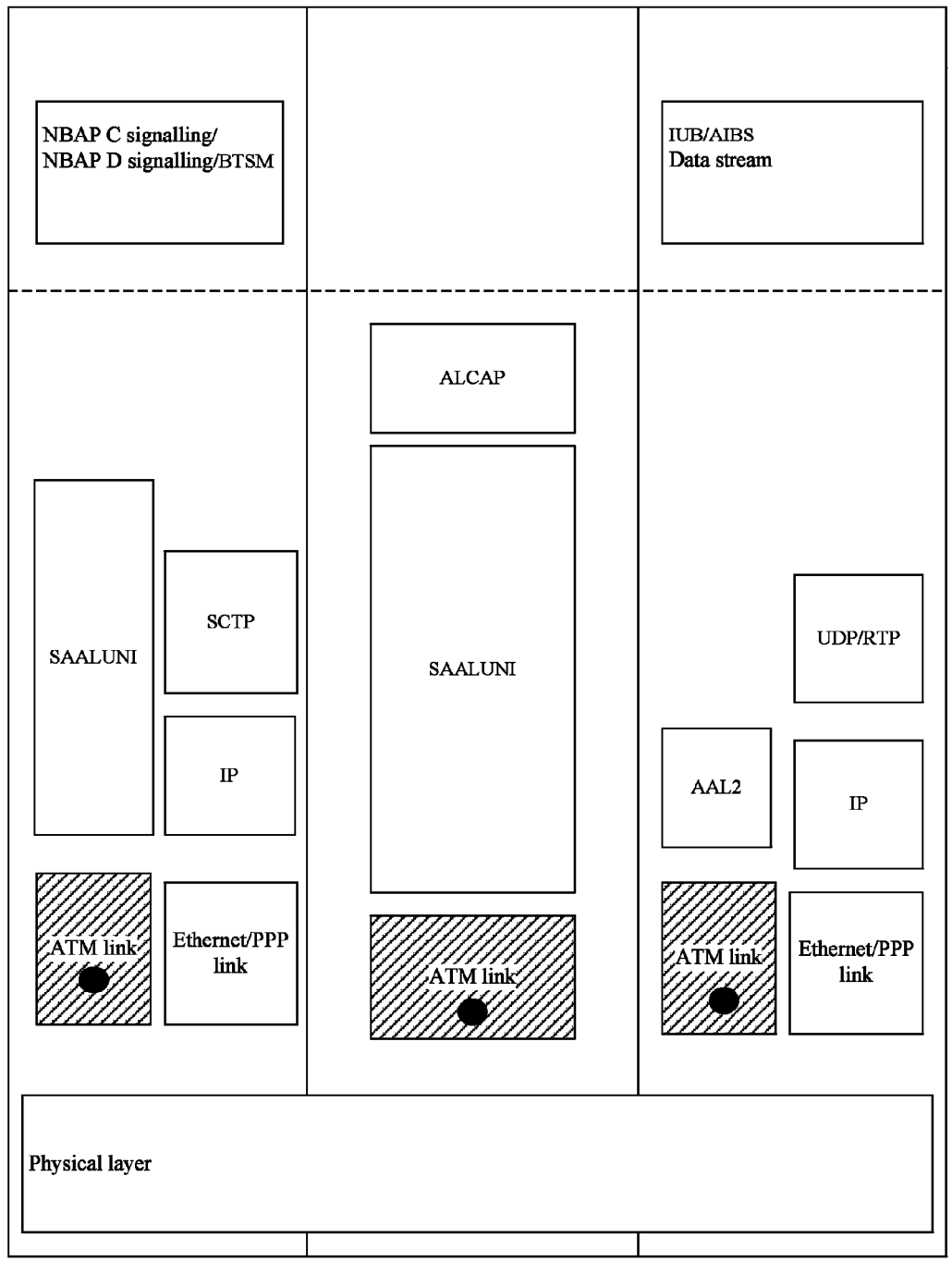
FIG. 13 is a displayed topology diagram of transport MO object state according to a preferred embodiment of the disclosure.

During a preferred implementation, the function of displaying the state on the transport MO object displaying topology diagram can be provided, and specifically, the state of each object is acquired, whether there is a faulty MO object is determined, and if an MO object of a certain protocol block is faulty, then fault indication information will be added on this protocol stack (such as adding small circle points to indicate a fault). As shown in FIG. 13, there is a faulty MO object in ATMLink, and black small circle points are added.

By means of the above-mentioned processing, after the objectified abstraction of the transport data, alarm representation and state representation can be supported, and this intuitive and brief topology representation enables the processing and representation of transport data by the network management LMT to be standardized and specialized.

Figure 14:
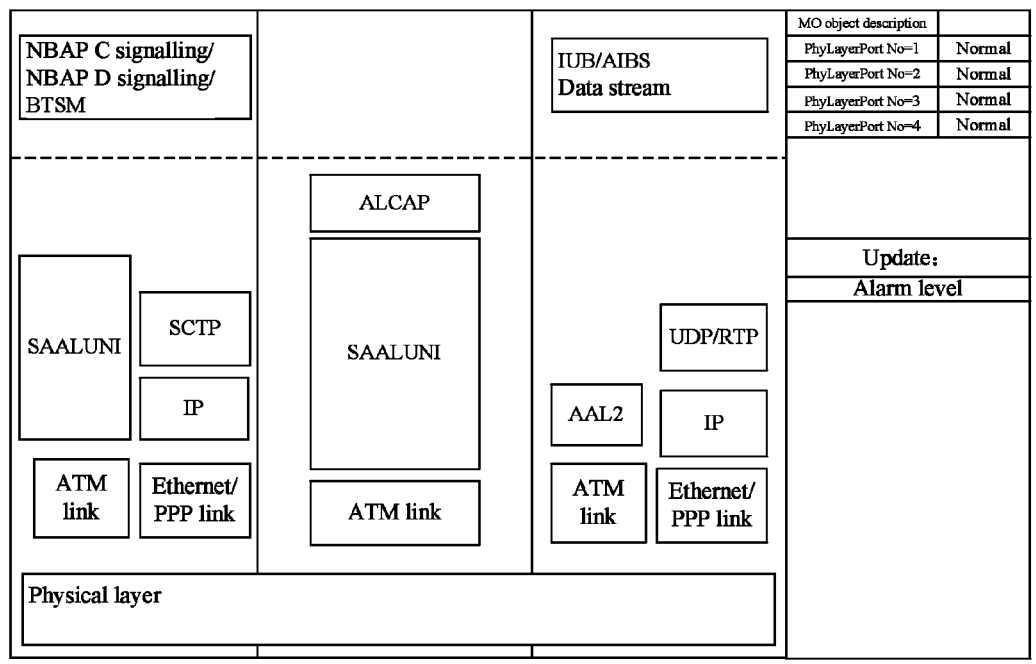
FIG. 14 is a schematic diagram of full-interface layout of LMT objectification-represented transport data according to a preferred embodiment of the disclosure.

An example of the full-interface view of the transport resources can be made reference to the description of FIG. 14, wherein the left part of FIG. 14 is a transport MO object display topology diagram, the right part is an MO object state list corresponding to a particularly selected protocol block, in which list, a single selected MO object can be operated, and an alarm view of the MO object corresponding to the selected protocol block.

Figure 15:
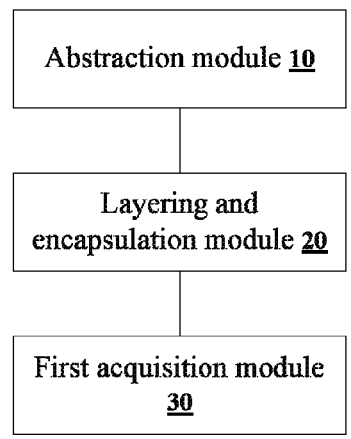
FIG. 15 is a structural block diagram of a device for processing transport configuration data according to an embodiment of the disclosure.

FIG. 15 is structural block diagram of a device for processing transport configuration data according to an embodiment of the disclosure. As shown in FIG. 15, the device for processing transport configuration data according to an embodiment of the disclosure includes: an abstraction module 10 configured to abstract each object of transport configuration data from an LMT network management configuration system; a layering and encapsulation module 20 configured to layer and encapsulate each object according to a hierarchical structure of an Iub interface protocol stack; and a first acquisition module 30 configured to acquire association relationship among layered objects according to a predetermined transport bearer manner.

In the device for processing transport configuration data shown in FIG. 15, the abstraction module 10, the layering and encapsulation module 20 and the first acquisition module 30 combine with each other to model the LMT transport configuration data based on the Iub interface protocol stack, so that the hierarchical structure and the dependence of the transport data can be represented clearly, and thus the transport configuration data of the network management LMT can be displayed intuitively and the operation and maintenance costs can be saved.

Figure 16:
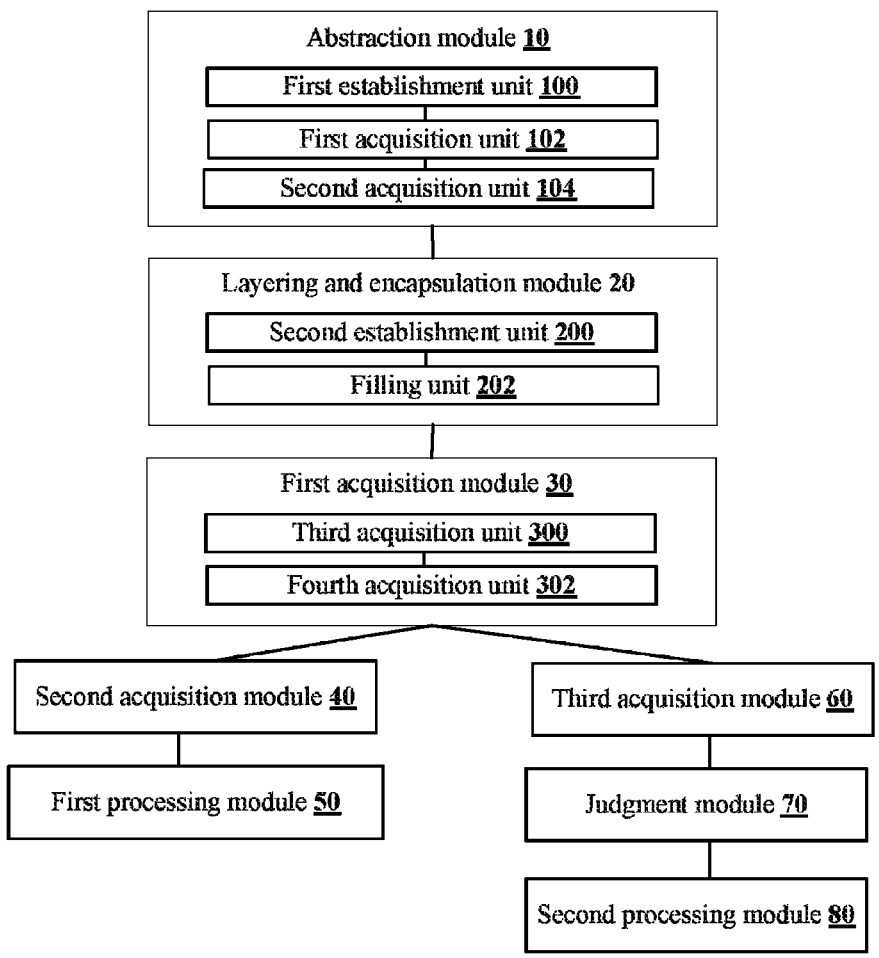
FIG. 16 is a structural block diagram of a device for processing transport configuration data according to a preferred embodiment of the disclosure.

Preferably, as shown in FIG. 16, the abstraction module 10 includes: a first establishment unit 100 configured to establish a communication link between the LMT network management configuration system and a base station; a first acquisition unit 102 configured to enable the LMT network management configuration system to acquire the transport configuration data from the base station; a second acquisition unit 104 configured to acquire an instance of each object of the transport configuration data.

Preferably, as shown in FIG. 16, the layering and encapsulation module 20 may further include: a second establishment unit 200 configured to establish correlation between an object and signalling of the Iub interface protocol stack; a filling unit 202 configured to fill the object into a predetermined number of transport protocol blocks in the Iub interface protocol stack of the signalling corresponding to the object.

Preferably, as shown in FIG. 16, the first acquisition module 30 may further include: a third acquisition unit 300 configured to acquire an object layered according to the hierarchical structure of the Iub interface protocol stack; a fourth acquisition unit 302 configured to acquire the association relationship among the layered objects according to an IP or ATM transport bearer manner.

Preferably, as shown in FIG. 16, the device for processing transport configuration data may further include: a second acquisition module 40 configured to acquire alarm information of each object; a first processing module 50 configured to add identification information to the highest alarm level corresponding to each object.

Preferably, as shown in FIG. 16, the device for processing transport configuration data may further include: a third acquisition module 60 configured to acquire state information of each object in the transport protocol block; a judgment module 70 configured to judge whether there is a faulty object; a second processing module 80 configured to add fault indication information to the faulty object.

During a preferred implementation, as shown in FIG. 6, the abstraction module 10 is configured to acquire an MO object abstracted after objectification of transport configuration data, and the layering and encapsulation module 20 is configured to layer and encapsulate the MO object according to the Iub interface protocol logic of 3GPP (as shown in FIG. 5), and perform modelling to generate a transport MO object display topology diagram (as shown in FIG. 11). The following processing is included specifically:

(1) all MO objects relevant to a transport service are acquired; and (2) the MO objects are divided according to the protocol stack to generate a transport MO object display topology diagram.

For example, according to the Iub interface protocol of 3GPP, the topology diagram is divided into 11 protocol blocks:

(1) Physical Layer: a physical layer object can be filled in this protocol block, including an IP port and an ATM port;

(2) ATM Link: an AtmLayerLink object can be filled in this protocol block;

(3) Ethernet/PPP Link: a data link object can be filled in this protocol block, including Ethernet, HDLC and PPP;

(4) IP: an IP object can be filled in this protocol block;

(5) SCTP: an SCTP object can be filled in this protocol block;

(6) UDP/RTP: a UDP/RTP object can be filled in this protocol block;

(7) AAL2: an AAL2 object can be filled in this protocol block;

(8) SaalUni: a SaalUni object can be filled in this protocol block;

(9) ALCAP: an ALCAP object can be filled in this protocol block;

(10) NbapCSignalling/NbapDSignalling/BTSM: a NBAP object can be filled in this protocol block;

(11) Iub/Aibs DataStream: an Iub/AibsDataStream object can be filled in this protocol block.

20 MO objects of the LMT transport data have been modelled by taking the Iub protocol logic diagram as the original model and filled into 11 protocol blocks of the LMT topology representation protocol stack diagram, and the hierarchical design of the transport data is completed. The generated modelling effect of LMT transport data topology representation is as shown in FIG. 11.

Then, the first acquisition module 30 acquires the association relationship among the layered objects according to a predetermined transport bearer manner. Specifically, after the objectification of the LMT transport data, based on the main transport bearer manner, two kinds of association relationships after MO objects are layered can be obtained finally, wherein the IP transport bearer manner is as shown in FIG. 7, and the ATM transport bearer manner is as shown in FIG. 8.

During a preferred implementation, the function of displaying the alarm on the transport MO object displaying topology diagram can be provided, and specifically, the alarm information of each MO object is acquired by the second acquisition module 40, identification information is added by the first processing module 50 according to the highest alarm level (such as filling a colour), the highest level alarm is acquired according to the alarm view in each protocol block, and colour rendering is performed according to the alarm level. As shown in FIG. 12, the highest alarm level of ATMLink is severe alarm, and it is rendered as red (referring to the shadow portion in the figure).

During a preferred implementation, the function of displaying the state on the transport MO object displaying topology diagram can be provided, and specifically, the third acquisition module 60 acquires the state of each object, the judgment module 70 judges whether there is a faulty MO object, and if there is a faulty MO object in a certain protocol block, the second processing module 80 adds fault indication information on this protocol block (such as adding small circle points to show a fault). As shown in FIG. 13, there is a faulty MO object in ATMLink, and black small circle points are added.

The generated full-interface view of the transport resources can be made reference to the description of FIG. 14, the left part of FIG. 14 is a transport MO object display topology diagram, the right part is an MO object state list corresponding to a particularly selected protocol block, in which list, a single selected MO object can be operated, and an alarm view of the MO object corresponding to the selected protocol block.

If there is no corresponding MO object in a certain protocol block, this protocol stack can be shown as a recess shape, and during a specific operation, a prompt of no installation is given to the user when a mouse is moved to this protocol block.

It should be noted that the device for processing transport configuration data can be configured in an LMT network management system.

In summary, by means of the embodiments provided in the disclosure, the following technical effects are realized: (1) the query result of the transport data is clear and intuitive, thus facilitating the operation and maintenance of services. (2) the representation of the transport data is more standard and specialized, the data representation thereof is closer to the protocol stack, and the operation and maintenance person can clearly know the layer of the transport data in the protocol stack without knowing the specific details of the protocol, which greatly facilitates the troubleshooting by the operation and maintenance person if there is a faulty link. (3) the transport data view directly represents the alarm and state of the object, realizing information representation maximization of the topology diagram.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for processing transport configuration data, comprising:
    abstracting each object of transport configuration data from a local maintenance terminal (LMT) network management configuration system;
    layering and encapsulating each object according to a hierarchical structure of an Iub interface protocol stack; and
    acquiring association relationships among layered objects of different layers according to a predetermined transport bearer manner;
    wherein abstracting each object of the transport configuration data from the LMT network management configuration system comprises:
    establishing a communication link between the LMT network management configuration system and a base station;
    acquiring, by the LMT network management configuration system, the transport configuration data from the base station; and
    acquiring an instance of each object of the transport configuration data;
    wherein layering and encapsulating each object according to the hierarchical structure of the Iub interface protocol stack comprises:
    establishing correlation between an object and signalling of the Iub interface protocol stack; and
    filling the object into a predetermined number of transport protocol blocks in the Iub interface protocol stack of the signalling corresponding to the object.

2. The method according to claim 1, wherein acquiring the association relationship among the layered objects of different layers according to the predetermined transport bearer manner comprises:
    acquiring objects layered according to the hierarchical structure of the Iub interface protocol stack; and
    acquiring the association relationship among the layered objects of different layers according to an Internet Protocol (IP) transport bearer manner or an asynchronous transfer mode (ATM) transport bearer manner.

3. The method according to claim 1, wherein after acquiring the association relationship among the layered objects of different layers according to the predetermined transport bearer manner, the method further comprises:
    acquiring alarm information of each object; and
    adding identification information to a highest alarm level corresponding to each object.

4. The method according to claim 1, wherein after acquiring the association relationship among the layered objects of different layers according to the predetermined transport bearer manner, the method further comprises:

acquiring state information of each object in a transport protocol block;
judging whether there is a faulty object; and
adding fault indication information to the faulty object.

5. A device for processing transport configuration data, comprising a hardware processor, wherein the hardware processor is configured to perform functions of an abstraction module, a layering and encapsulation module, and a first acquisition module:
the abstraction module, configured to abstract each object of transport configuration data from a local maintenance terminal (LMT) network management configuration system;
the layering and encapsulation module, configured to layer and encapsulate each object according to a hierarchical structure of an Iub interface protocol stack; and
the first acquisition module, configured to acquire association relationships among layered objects of different layers according to a predetermined transport bearer manner;
wherein the abstraction module comprises:
a first establishment unit, configured to establish a communication link between the LMT network management configuration system and a base station;
a first acquisition unit, configured to enable the LMT network management configuration system to acquire the transport configuration data from the base station; and
a second acquisition unit, configured to acquire an instance of each object of the transport configuration data;
wherein the layering and encapsulation module comprises:
a second establishment unit, configured to establish correlation between the object and signalling of the Iub interface protocol stack; and
a filling unit, configured to fill the object into a predetermined number of transport protocol blocks in the Iub interface protocol stack of the signalling corresponding to the object.

6. The device according to claim 5, wherein the first acquisition module comprises:
a third acquisition unit, configured to acquire objects layered according to the hierarchical structure of the Iub interface protocol stack; and
a fourth acquisition unit, configured to acquire the association relationship among the layered objects of different layers according to an Internet Protocol (IP) or asynchronous transfer mode (ATM) transport bearer manner.

7. The device according to claim 5, wherein the hardware processor is further configured to perform functions of a second acquisition module and a first processing module:
the second acquisition module, configured to acquire alarm information of each object; and
the first processing module, configured to add identification information to a highest alarm level corresponding to each object.

8. The device according to claim 5, wherein the hardware processor is further configured to perform functions of a third acquisition module, a judgment module, and a second processing module:
the third acquisition module, configured to acquire state information of each object in a transport protocol block;
the judgment module, configured to judge whether there is a faulty object; and
the second processing module, configured to add fault indication information to the faulty object.

9. The method according to claim 1, wherein after acquiring the association relationship among the layered objects according to the predetermined transport bearer manner, the method further comprises:
acquiring alarm information of each object; and
adding identification information to a highest alarm level corresponding to each object.

10. The method according to claim 2, wherein after acquiring the association relationship among the layered objects according to the predetermined transport bearer manner, the method further comprises:
acquiring alarm information of each object; and
adding identification information to a highest alarm level corresponding to each object.

11. The method according to claim 1, wherein after acquiring the association relationship among the layered objects according to the predetermined transport bearer manner, the method further comprises:
acquiring state information of each object in a transport protocol block;
judging whether there is a faulty object; and
adding fault indication information to the faulty object.

12. The method according to claim 2, wherein after acquiring the association relationship among the layered objects according to the predetermined transport bearer manner, the method further comprises:
acquiring state information of each object in a transport protocol block;
judging whether there is a faulty object; and
adding fault indication information to the faulty object.

13. The device according to claim 5, wherein the hardware processor is further configured to perform function of a second acquisition module and a first processing module:
the second acquisition module, configured to acquire alarm information of each object; and
the first processing module, configured to add identification information to a highest alarm level corresponding to each object.

14. The device according to claim 6, wherein the hardware processor is further configured to perform function of a second acquisition module and a first processing module:
a second acquisition module, configured to acquire alarm information of each object; and
a first processing module, configured to add identification information to a highest alarm level corresponding to each object.

15. The device according to claim 5, wherein the hardware processor is further configured to perform function of a third acquisition module, a judgment module, and a second processing module:
the third acquisition module, configured to acquire state information of each object in a transport protocol block;
the judgment module, configured to judge whether there is a faulty object; and
the second processing module, configured to add fault indication information to the faulty object.

* * * * *